March 16, 1926.

N. H. FOOKS 1,577,219

APPARATUS FOR COOKING AND COOLING IN SEALED RECEPTACLES

Filed March 11, 1925

Inventor

Nelson H. Fooks.

By Mason Fenwick & Lawrence
Attorneys

Patented Mar. 16, 1926.

1,577,219

UNITED STATES PATENT OFFICE.

NELSON H. FOOKS, OF PRESTON, MARYLAND.

APPARATUS FOR COOKING AND COOLING IN SEALED RECEPTACLES.

Application filed March 11, 1925. Serial No. 14,804.

*To all whom it may concern:*

Be it known that I, NELSON H. FOOKS, a citizen of the United States, residing at Preston, in the county of Caroline and State of Maryland, have invented certain new and useful Improvements in Apparatus for Cooking and Cooling in Sealed Receptacles; and I do hereby declare the following to be a full, clear, and exact description of the invention, such as will enable others, skilled in the art to which it appertains to make and use the same.

This invention relates to apparatus for cooking and cooling foods and the like in sealed receptacles and more particularly to an apparatus for cooking and cooling in such sealed receptacles by means of a single liquid medium.

The process of thus cooking and cooling in a single liquid medium is more particularly described and claimed in my co-pending application for Patent, Ser. No. 8,842.

The object of the present invention is to provide an improved and simplified apparatus adapted to permit the efficient cooking and cooling in sealed receptacles under substantially uniform pressure.

The invention consists in the novel construction, arrangement and combination of parts as hereinafter more particularly described and claimed.

One sheet of drawings accompanies this specification as part thereof, in which like reference characters indicate like parts throughout.

Figure 1:
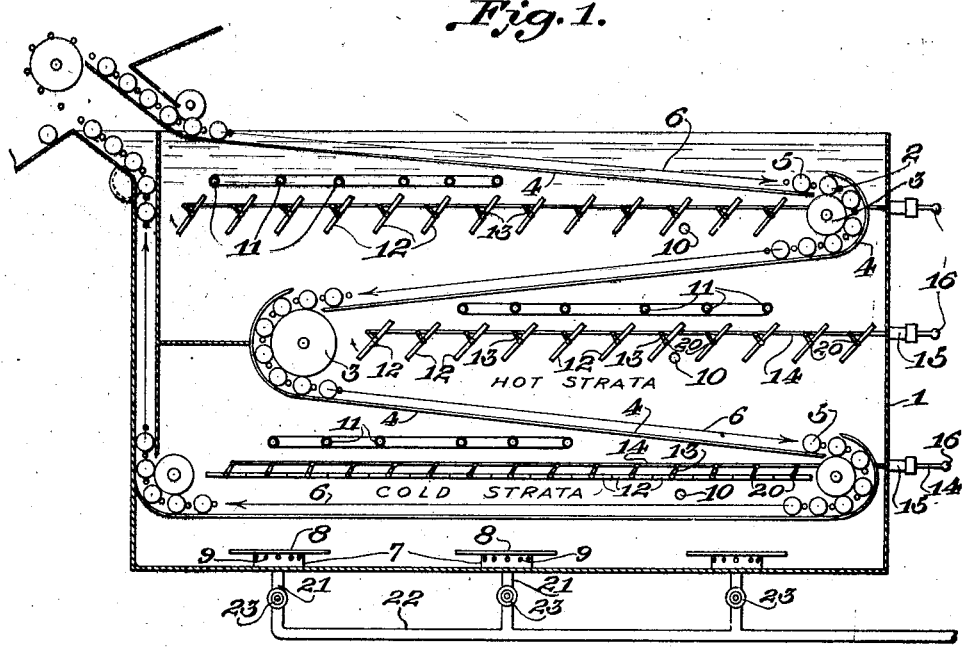
Fig. 1 is a vertical cross sectional view through my improved apparatus, largely diagrammatic, indicating certain of the interior parts in elevation.
Figure 2:
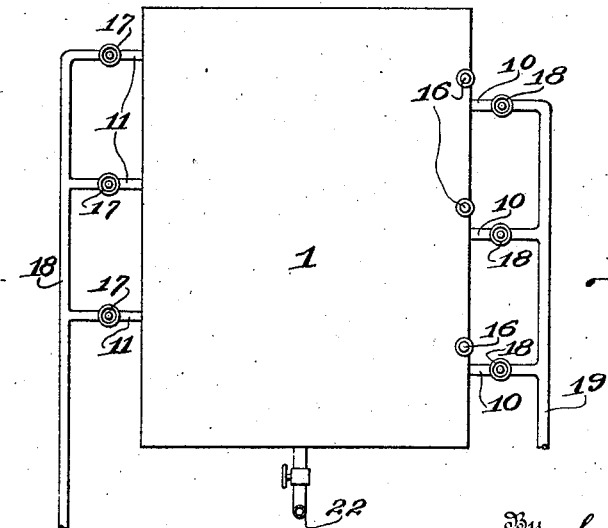
Fig. 2 is an end elevation.

In accordance with the present invention, a suitable container 1 is provided in which is arranged an endless conveyor 2 passing over suitable guide rollers 3 and in association with suitable can guides 4, by means of which conveyor and can guides sealed receptacles 5 can be advanced from the top of the container by way of a circuitous course, as indicated, substantially to the bottom of the conveyor, and thence outward again at the top, as is clearly indicated in Fig. 1, the direction of the conveyor and cans being indicated by arrows.

Within the container 1 and disposed in spaced vertical relation are a plurality of heating elements 11 which may be constructed in any well-known manner, the drawing here illustrating a plurality of communicating pipes through which steam may be passed from a suitable source (not shown). Each of the heating elements 11 is independently controlled by means of a suitable valve 17, so that the steam may be admitted as desired to any one or more of these heating elements.

The container 1 is also provided with a plurality of vertically spaced outlet pipes 10, each of said outlet pipes 10 communicating with the container slightly below one of the heating units 11. Each of the outlet pipes 10 is independently controlled by a suitable valve 18, so that the contents of the container may be withdrawn as desired from any one of these outlet pipes, which may be and preferably are connected to a suitable waste pipe 19.

Intermediate each heating unit and its corresponding outlet pipe is positioned a horizontal baffle 12, which baffles consist of a plurality of shutters pivoted on the side walls of the container 1 by means of pivots 20 and each of said baffle plates 12 having a fixed lever arm 13, the lever arms 13 of each horizontal group of baffles being pivotally associated with a connecting rod 14 which extends through suitable pack glands 15 in the front wall of the container and terminate in handles 16, thus permitting, by a longitudinal motion of the rods 14, the angular adjustment of the baffle plates 12, so that said baffle plates may be positioned horizontally, as illustrated, in the lowermost unit in Fig. 1 to constitute a continuous horizontal baffle or may be swung into angular or vertical position, as desired, as indicated in the two upper units in Fig. 1.

Water or other suitable liquid is supplied to container 1 through pipe 22, which is preferably branched into pipes 21, each controlled by a suitable valve 23, by means of which the supply of liquid to the container may be regulated.

Each of the branch supply pipes 21 is provided within the container 1 with a distributing nozzle which comprises preferably a cylindrical member 7 having a plurality of radially directed orifices 9 and a top 8 extending beyond the part 7 to overhang the same, so that the liquid discharged through the orifices 9 will be spread horizontally over the floor of the container rather than upwardly, the tops 8 operating as baffles to eliminate vertical currents in the liquid.

The operation of the apparatus is quite simple. When a relatively deep cooking medium is desired, steam may be supplied through all of the heating units 11, as illustrated in Fig. 1. In this event, the lowermost baffles would be closed, as shown, and the valve of the lowermost outlet pipe 10 opened. The upper baffles would be left open, as illustrated, and the valves of the upper outlet pipes closed.

With the apparatus in this condition, the water or fluid within the container would be heated rapidly and efficiently above the lowermost baffle by convection, the vertical water currents being relatively uninterrupted above that baffle. On the other hand, the water below the lowermost baffle would remain substantially cold, there being no convection currents, the baffle preventing vertical currents below that level. Any slight conduction of heat below the lowermost baffle is eliminated by a slight current of water passing from the inlet nozzles 7 to the lowermost outlet pipe 10.

In a similar manner a cooking medium of less depth may be utilized by closing off the lower heating unit and closing the baffle associated with the next higher steam unit or, if preferred, by closing off the two lower heating units and closing the uppermost baffle.

Obviously, the number of heating units with their corresponding baffles may be multiplied as desired and varying forms of structure will readily suggest themselves to those skilled in the art, but within the scope of the present invention as claimed.

What I claim is:

1. Apparatus for cooking and cooling in sealed receptacles comprising a liquid container, means for supplying heat positioned within the container and intermediate the top and bottom liquid levels, and a baffle located below the level of the heat-supplying means adapted to prevent currents in the liquid below said heating means.

2. Apparatus as specified in claim 1, in which the baffle extends horizontally.

3. Apparatus as specified in claim 1, in which the baffle is adjustable.

4. Apparatus for cooking and cooling in sealed receptacles comprising a liquid container, a plurality of vertically spaced horizontally disposed heat-supplying units, means for independently controlling said heating units, a plurality of baffles, one positioned under and adjacent each heating unit, and means for independently adjusting each of said baffles.

5. Apparatus for cooking and cooling in sealed receptacles comprising a container, a plurality of independently controlled heat-supplying units spaced vertically in the container, and an adjustable baffle positioned below and adjacent each heat unit, each of said baffles consisting of a plurality of pivoted vanes, each vane having a lever arm and a connecting bar for associating said levers, the connecting bars extending out of the container, whereby said baffles may be independently and selectively adjusted.

6. In an apparatus for cooking and cooling in sealed receptacles, a liquid container, means for conveying receptacles through the container by a circuitous route and from the top downwardly, means for selectively supplying heat to the liquid contents at varying levels to provide an upper heated strata of liquid, and a lower cool strata of liquid, and means for preventing liquid currents between the heated and cool stratas.

7. In an apparatus for cooking and cooling in sealed receptacles, a liquid container, means for selectively supplying heat to the liquid contents at varying levels to provide an upper heated strata and a lower cool strata of liquid, means for supplying cold water adjacent the bottom of the container and means selectively and independently operable for withdrawing water from the container at points below and adjacent the several heat-supply levels of the container.

8. An apparatus for cooking and cooling in sealed receptacles comprising a liquid container, means for conveying the receptacles through the container by a circuitous route and from the top downwardly, a plurality of vertically spaced independently controlled heat supply units in the container a plurality of independently controlled outlets, one positioned below and adjacent each heat supply unit, an independently operable baffle disposed between each heat unit and the corresponding outlet and means for supplying liquid to the container adjacent the bottom.

In testimony whereof I affix my signature.

NELSON H. FOOKS.